Patented May 13, 1941

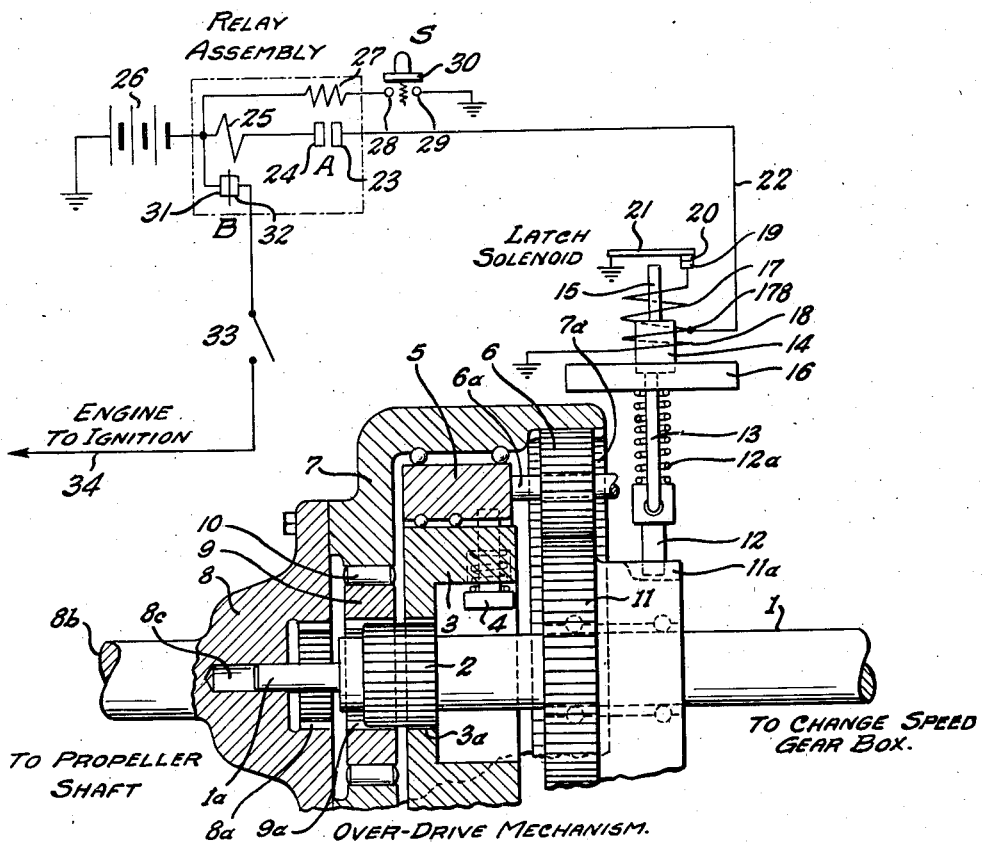

2,241,631

UNITED STATES PATENT OFFICE 2,241,631

OVERDRIVE CONTROL SYSTEM

Edward M. Claytor, Anderson, Ind., assignor to General Motors Corporation, Detroit, Mich., a corporation of Delaware Application November 23, 1938, Serial No. 241,917

4 Claims. (Cl. 74—290)

This invention relates to overdrives for automobiles. The type of overdrive to which the present invention relates is a device which is located in the line of transmission between the change speed gear box and the driving wheels of the vehicle. This overdrive includes a sun gear cooperating with a planet gear which in turn drives an internal gear. The internal gear, or the frame which supports it, is the driven member of the overdrive mechanism. The driving member of the overdrive mechanism is a shaft around which the sun gear may rotate unless it be otherwise fixed from rotating. Around this same driving shaft there rotates a ring carrying one or more of the planet gears. The planet gear carrying ring is automatically connected with the driving shaft by a centrifugal latch. When the overdrive is operating, the sun gear is latched in stationary position. When it is desired to render the overdrive inoperative, the sun gear latch is withdrawn to permit the sun gear, the planet gears and the internal gear to rotate together. Under these conditions the drive shaft drives the frame which carries the internal gear through the interposition of a one-way clutch.

This invention has to do with electrically operated mechanism for controlling the sun gear latch. The sun gear latch is spring pressed into a notch on the edge of the hub of the sun gear in order to hold the sun gear in stationary position. When it is desired to withdraw the latch, current is sent from a storage battery or other current source into an electromagnet which lifts the latch from disengagement with the sun gear. When the sun gear latch is being disengaged from the hub of the sun gear, it will meet with resistance due to the fact that the engine is applying power to the rear wheels of the vehicle through the planet gears. The planet gears react against the sun gears while they are transmitting power to the internal gear which operates the propeller shaft connected with the rear or driving wheels of the vehicle. Therefore, it has been found necessary to relieve the torque of the engine at the instant the sun gear latch is withdrawn from engagement with the hub of the sun gear. Heretofore the relieving of the torque of the engine is effected by grounding the ignition so that for a few cycles of engine operation there will be no ignition of the combustible mixture; and hence, no power will be developed by the engine. There are however certain objections to the grounding of the ignition as conditions may arise whereby a sparking impulse would be delivered to the wrong engine spark plug. To overcome this difficulty, I have provided a means for automatically interrupting the connection between the current source and the ignition apparatus so that the possibility of a miss-fire of the engine will be avoided.

Further objects and advantages of the present invention will be apparent from the following description, reference being had to the accompanying drawing wherein a preferred embodiment of the present invention is clearly shown.

In the drawing:

Fig. 1 is a view partly diagrammatic, partly structural showing a form of overdrive mechanism equipped with the electrical control apparatus which constitutes an embodiment of the invention.

Fig. 2 is a chart which shows the operation of the apparatus shown in Fig. 1 under different conditions.

Referring to Fig. 1, numeral 1 indicates the driving shaft of the overdrive mechanism. The shaft 1 receives its power from the change speed gear mechanism housed in a box which would be located between the overdrive mechanism and the engine clutch. The shaft 1 is provided with external splines 2 which mesh with internal splines 3a of the ring 3 and with internal splines 9a of the driving member of an over-running clutch 9. The external splines 2 mesh also with internal splines 8a of a coupling member 8 to which the propeller shaft 8b may be attached. The splines 2 connect together the members 3 and 9 as shown in Fig. 1, when it is desired to use the over-drive mechanism. When it is not intended that the over-drive mechanism shall be used for any considerable period of time, the over-drive may be entirely disconnected by moving the shaft 1 endwise towards the left so that its external splines 2 will engage the internal splines 8a of the member 8, thus connecting together the members 8 and 9 and leaving the member 3 free. The shaft 1 is supported for axially movement at both ends. The support for the right hand end of the shaft 1 is not shown. At the left end of the shaft 1 it is provided with a reduced portion 1a having a sliding fit within an axially alined recess 8c provided in the member 8.

The member 3 is connectible with the member 5 by means of a speed responsive latch 4. Member 5 is the planet gear ring supporting one or more planet gears 6. The planet gears 6, which are mounted upon rods 6a extending from the ring 5, mesh with sun gear 11 and with an internal gear 7a supported by a frame 7 which cooperates with the clutch rollers 10 which in turn cooperate with a driving clutch cam 9 to receive transmission of torque from the driving member at such times as the driving member 9 tends to rotate ahead of the member 7. However, when the hub of the sun gear 11 is engaged by a sun gear latch 12 which drops into a notch 11a of the hub of the sun gear as shown in Fig. 1, then the external gear 7a and hence its frame 7 are driven at a speed exceeding the speed of the clutch driving member 9. Under these conditions the member 7 will over-run the clutch driving member 9.

The sun gear latch 12 is urged downwardly into latching position by a spring 12a confined between the head of the latch 12 and the base 16 of a latch operating solenoid. The solenoid which lifts the sun gear latch 12 comprises a solenoid armature 14 connected with the latch 12 by a rod 13. The solenoid includes two magnet coils 17 and 18 which are connected together at the point 178. Coil 18 is grounded, and coil 17 is connected with the stationary contact 19 engageable by a movable contact 20 and fixed to the end of a leaf spring member 21 which is grounded. To the solenoid armature 14 there is fixed a rod 15 which engages the blade 21 to separate the contact 20 from the contact 19 when the solenoid armature 14 is attracted upwardly to retract the latch 12 from the notch 11a in the sun gear hub. The terminal 178 which is common to the solenoid magnet coils 17 and 18 is connected by wire 22 with a source of current through a relay mechanism to be described later. The coils 17 and 18 act cumulatively to effect the attraction of the armature 14 upwardly to withdraw the latch 12 from the sun gear. Since the amount of magnetic flux required to maintain the solenoid 14 in attracted position is much less than that required to withdraw the latch 12 from the sun gear, the magnet coil 17 is disabled by the opening of contacts 20 and 19 which is effected by the engagement of the rod 15 with the spring blade 21.

The latch solenoid and the engine ignition are controlled by an assemblage of relays which will now be described. The relay assembly comprises two relays. One relay includes a magnet winding 25 and normally closed contacts 31 and 32 hereinafter referred to as the pair of contacts B. Contact 32 is connected by ignition switch 33 with a wire 34 leading to the engine ignition apparatus. Relay magnet 25 is connected with a current source such as a storage battery 26 which is grounded. Relay magnet coil 25 is connected with a pair of normally open contacts A comprising a contact 24 directly connected with coil 25 and a contact 23 connected with the wire 22. Contacts A are parts of a second relay which includes also a magnet coil 27 connected with the storage battery and with ground through a switch S which comprises a movable switch contact 30 engageable with a stationary contact 28 connected with the magnet coil 27 and with a stationary contact 29 which is grounded.

Fig. 1 shows the overdrive mechanism in operating condition. As indicated in the first line of the chart of Fig. 2, the sun gear 11 is locked; the centrifugal latch 4 connects the parts 3 and 5; the solenoid latch 12 engages the hub of the sun gear 11; the switch S is open; the contacts A of the relay assembly are open; and the contacts B are closed. The overdrive operation consists of the transmission of torque from the shaft 1 through the elements 2, 3, 4, 5, 6, 7 and 8. The element 7 is driven faster than the element 1 by the operation of the planetary gear 7. Hence the member 7 which constitutes the driven member of an overrunning clutch is driven at a rate faster than it can be driven by the driving member 9 of the overrunning clutch. Hence the member 7 overruns the member 9.

When it is desired to dispense with the operation of the overdrive, the car driver will depress the switch S to cause the contact 30 to bridge the contacts 28 and 29, thereby causing current to flow from the battery 26 through the relay coil 27. The excitation of relay coil 27 effects the attraction of an armature, not shown, which causes the pair of contacts A which are normally open to be closed, thereby connecting the battery with the relay winding 25 and with the solenoid magnet windings 17 and 18. Winding 17 is of low resistance and produces the major portion of the flux required to attract the armature 14. Winding 18 is of higher resistance and will be ineffective, unaided by winding 17, to attract the armature 14. However, winding 18 is capable of holding armature 14 in attracted position. When both windings 17 and 18 are connected in parallel and both together in series with relay magnet coil 25, an armature (not shown) of the relay separates the normally closed pair of contacts B, thereby interrupting the flow of current from the battery to the ignition apparatus. This results in the prevention of the ignition of combustible mixture in the engine cylinder for a few cycles of operation. During this brief interval, the engine is not developing power. Therefore, no torque is being transmitted through the overdrive mechanism and there is no torque reaction between the sun gear 11 and the sun gear latch 12. Hence the latch solenoid magnet coils 17 and 18, though they be of relatively small electrical dimensions, are effective to produce the attraction of the solenoid armature 14 upwardly to lift the sun gear latch 12 out of engagement with the hub of the sun gear 11. As stated before, this upward movement of the solenoid armature 14 causes the rod 15 to engage the blade 21, separate the contact 20 from the contact 19. The separation of the contacts 19 and 20 results in the interruption of current flow from the battery 26 through the solenoid magnet coil 17. However, current will continue to flow through the magnet coil 18 which is sufficiently strong to maintain the armature 14 in the attracted position. The interruption of the flow of current through the solenoid magnet coil 17 reduces the total amount of current flowing through the relay magnet coil 25. The relay which includes this coil is so constructed that the contacts B will be opened only when current is flowing from the battery 26 through both magnet coils 17 and 18 of the latch solenoid; but, when current flows only through the solenoid magnet coil 18, the amount of current flowing through the relay magnet coil 25 will be insufficient to maintain the contacts B open. As a result of this correlation between the relay, which includes contacts B and the magnet coil 25, and the latch solenoid, there will be a brief transition period during which the ignition is cut off. This transition period is explained in the second line of the chart Fig. 2. This second line of Fig. 2 shows that the sun gear 11 is locked at the beginning of the transition period. The centrifugal latch 4 is still engaged. The solenoid latch is at engaged position at the beginning of the transition period and moves to disengaged position at the end of the transition period. The switch S remains closed; the contacts A remain closed, but the contacts B are opened during the transition period. During this transition period the ignition is cut off for a time approximating .025 of a second. This interval of .025 of a second represents approximately the time between the closing of the switch S and the retraction of the sun gear latch 12 from the hub of the sun gear and the opening of the contacts 19 and 20.

Immediately following the transition period during which the sun gear latch is disengaged, there follows the direct drive operation as indicated by the last line of the chart, Fig. 2. According to the last line of Fig. 2, the sun gear 11 is unlocked so that it is free to rotate. The centrifugal latch 4 remains in position for connecting the parts 3 and 5. The solenoid latch 12 is now disengaged. The switch S remains closed; the contacts A remain closed; and the contacts B, which were open during the transition period are now closed due to the fact that the amount of current passing through the relay magnet coil 25 is only that which is permitted by the existence of the wires and connecting coil with the battery and also the resistance of the latch solenoid magnet coil 18. During direct drive operation, the transmission of power takes place through the shaft 1, splines 2, overrunning clutch driving member 9, overrunning clutch power transmitting rollers 10 and overrunning clutch driven members 7 and the coupling member 8.

When it is desired to resume operation of the overdrive mechanism, the car driver merely releases the switch S whereupon conditions are restored to that shown in Fig. 1.

While the embodiment of the present invention as herein disclosed, constitutes a preferred form, it is to be understood that other forms might be adopted, all coming within the scope of the claims which follow.

What is claimed is as follows:

1. A system of electrical control of automobile overdrives comprising the combination with an overdrive mechanism having a sun gear and a latch for restraining movement of the sun gear, of a latch operating electromagnet, a current source, a switch for connecting the winding of the latch magnet with the current source, a normally closed, magnet opened relay switch for connecting the current source with the automobile engine ignition, said relay switch having a magnet coil in series with the current source and latch magnet windings for the purpose of opening the ignition circuit when the latch magnet operates to retract the latch from the sun gear, and means responsive to the retractive movement of the latch for decreasing the amount of current flowing through the relay switch magnet coil whereby the relay switch recloses the ignition circuit after the latch has been retracted from the sun gear.

2. A system according to claim 1, in which the latch operating electromagnet has two coil windings in parallel one being of low resistance and the other of higher resistance, and in which the retractive movement of the latch causes the low resistance winding to be open-circuited thereby increasing the resistance of the circuit which includes the relay switch magnet coil.

3. A system of electrical control of automobile overdrives comprising the combination with an overdrive mechanism having a sun gear and latch for restraining movement of the sun gear, of a latch operating electromagnet, a current source, a switch for connecting the winding of the latch magnet with the current source, engine ignition apparatus operated by current from the current source, means responsive to operation of said switch for disconnecting the current source from the ignition apparatus, and means responsive to retraction of the latch for rendering ineffective the means which disconnects the current source from the ignition apparatus.

4. A system of electrical control of automobile overdrives comprising the combination with an overdrive mechanism having a sun gear and a latch for restraining movement of the sun gear, of a latch operating electromagnet, a current source, a switch for connecting the winding of the latch magnet with the current source, engine ignition apparatus operated by current from the current source, a relay switch rendered operative in response to operation of the first named switch for disconnecting the current source from the ignition apparatus, and means responsive to retraction of the latch for reducing the current in the magnet coil of the relay switch in order to render said relay switch ineffective to disconnect the current source from the ignition apparatus.

EDWARD M. CLAYTOR.